May 12, 1964                H. ALLEN                3,132,662

VALVE APPARATUS FOR USE AS A BLOWOUT PREVENTER OR THE LIKE

Filed Dec. 5, 1958                                    9 Sheets-Sheet 1

Herbert Allen
INVENTOR.

BY
ATTORNEYS

Herbert Allen
INVENTOR.

Herbert Allen
INVENTOR.

May 12, 1964

H. ALLEN 3,132,662

VALVE APPARATUS FOR USE AS A BLOWOUT PREVENTER OR THE LIKE

Filed Dec. 5, 1958

Herbert Allen
INVENTOR.

BY Browning, Simms, Hyer
& Eckenrodt
ATTORNEYS

United States Patent Office 3,132,662
Patented May 12, 1964

3,132,662
VALVE APPARATUS FOR USE AS A BLOWOUT
PREVENTER OR THE LIKE
Herbert Allen, Houston, Tex., assignor to Cameron Iron
Works, Inc., Houston, Tex.
Filed Dec. 5, 1958, Ser. No. 778,342
29 Claims. (Cl. 137—315)

This invention relates to valve apparatus and, more particularly, to apparatus of this type especially well adapted for use as a blowout preventer.

This application is a continuation-in-part of my co-pending application, Serial No. 673,299, filed July 22, 1957, and entitled "Valve Apparatus," now abandoned.

In the drilling and completion of oil and gas wells, it is frequently necessary to seal off the well at the wellhead and, if a pipe is disposed within the well, to seal about the pipe. The valve apparatus commonly employed for this purpose is known as a blowout preventer, and comprises a body disposable at the wellhead and having a bore therethrough to form a continuation of the well. Two or more rams are movable longitudinally within guideways in the body intersecting the bore between positions retracted from the bore for opening same and positions extending across the bore and into engagement with one another for closing the bore. The inner ends of the rams may be formed to fit about and seal with a pipe within the bore therethrough.

These preventers are generally of special construction for handling the high pressures encountered in such wells. Thus, the outer ends of the rams may be exposed to well pressure within the bore so that when the rams are moved into closed position, their inner ends will be held tightly against one another due to a pressure differential thereacross. While this construction aids in holding the rams closed against high pressures, it makes them more difficult to open, at least until their inner ends are moved out of engagement with one another so that well pressure is permitted to act across the entire inner end of the rams.

The actuators for reciprocating the rams are generally connected thereto by a stem sealably reciprocable within the openings through bonnets which close the guideways for the rams in the body. Thus, the force for closing the rams must act against a force due to well pressure acting against the cross-sectional area of the stem. The conventional hydraulic actuators have involved complicated piping on the preventer body, and have had to be designed to meet peak operating requirements.

An object of the present invention is to provide a blowout preventer of compact and simplified construction, including a body which may be forged.

Another object is to provide a blowout preventer which requires only a small amount of space and thereby provides a large working area thereabout.

Still another object is to provide a blowout preventer having minimum fluid power operating requirements.

Yet another object is to provide valve apparatus, such as a blowout preventer, in which the closure member or ram and parts thereof are easily and readily replaceable.

A further object is to provide valve apparatus having an actuator for moving the closure member between its closed position and another position in which such member need only be pulled out from its guideway for replacement.

A still further object is to provide apparatus of the character described in either of the last two objects having means for moving the closure member which is arranged to provide mechanical advantage which varies in accordance with the requirements of the closure member at different stages of its operation.

A still further object is to provide such apparatus with means for moving the closure member which has no "piston effect," such as is the case with reciprocable stems in the prior art.

A still further object is to provide valve apparatus of the general type described having such moving means arranged to relieve frictional forces between the closure member and guideway, particularly at the start of the opening movement of the closure member.

Still a further object is to provide a blowout preventer having an external actuator for the rams which is particularly well suited for use with apparatus constructed in accordance with the foregoing objects.

Still another object is to provide a blowout preventer having an external operator with a simplified arrangement for locking the rams thereof in closed position.

Other objects, advantages and features of this invention will be apparent to one skilled in the art upon a consideration of the written specification, the attached claims and the annexed drawings.

The valve apparatus of the present invention comprises a body having a bore therethrough and a guideway therein intersecting the bore. A closure member is closely fittable within the guideway for movement between bore opening and closing positions. When such apparatus is used as a blowout preventer, its bore is intersected by two or more guideways, and a ram is movable within each of said guideways between a closed position in which it is extended across the bore for engagement with another ram and an open position in which it is retracted from the bore. As in prior apparatus of this type, the outer end of each guideway may be closed by a bonnet and the outer end of each ram may be exposed to the pressure of the fluid within the bore upstream of the ram, which will be well pressure in the case of a blowout preventer.

The means for moving each ram comprises an internal crank arm connected to a shaft mounted on the body for rotation about an axis transverse to the direction of movement of the ram. One end of the internal crank arm is receivable within a slot in the arm for moving said ram between opened and closed positions in response to rotation of the shaft. This construction reduces the power requirements of the preventer by eliminating the "piston effect" of the conventional reciprocating stem, and also prevents dirt and other debris from being dragged through the seals, as is common in the case of a reciprocating stem.

In order to facilitate removal of the ram, the crank arm is also swingable to move the ram to another position in which it is loosely received within the guideway and disengaged from the ram to permit said ram to be removed from the open outer end of the guideway. For this purpose, the guideway is provided with a relieved portion and the slot in the rams opens to one side to permit the one end of the crank arm to swing out of engagement therewith when the ram is loosely received in the relieved portion. More particularly, the ram is provided with seal means including a sealing strip thereacross for sealing with one side of the guideway during its movement between opened and closed positions, and the relieved portion is disposed at the outer end of the other side of the guideway so that the sealing engagement between the ram and guideway is broken at the time said ram is pulled from the guideway.

A shoulder on the outer end of the other side of the ram is slidable within the relieved portion of the guideway during its movement between opened and closed position so as to prevent it from tilting, particularly under the influence of well pressure in its closed position. As the ram is moved to said other position, this shoulder is projected out of the open outer end of the guideway to permit said ram to be received within the relieved portion.

By virtue of the above-described simplified construction, this body may be forged. Furthermore, the preventer provides a maximum of working area since its compact construction provides a body of minimum height, width and length.

The ram slot and the crank arm are so arranged that the end of the crank arm received in the slot exerts a relatively large force upon the ram toward the end of its closing movement and at the start of its opening movement, and moves the closure member at a relatively rapid average rate throughout the remainder of its opening and closing movements. More particularly, the end of the crank arm is provided with a roller engageable with opposite sides of the slot, and such opposite sides extend in directions which form acute angles with the direction of movement of the ram. When these sides are flat, they are arranged to dispose a plane through the axes of rotation of the crank arm and its roller substantially parallel to one side of the slot in the open position of the ram and substantially perpendicular to the other side of the slot in the closed position thereof. When the opposite sides of the slot are curved, they are arranged to dispose such a plane substantially parallel to a plane tangent to one side of the slot at the engagement therewith of said roller in the open position of the ram and substantially perpendicular to a plane tangent to the other side of the slot at the engagement therewith of said roller in the closed position of the ram.

Furthermore, the above-mentioned sides of the slot in each ram are sloped outwardly toward the sealing strip across one side thereof. In this manner, the roller on the end of the crank arm exerts a force on the ram, during its opening movement, which urges it away from said side so as to relieve the frictional force between the ram and guideway.

It is obvious that this novel construction accomplishes many of the objects of the present invention since, as previously mentioned, the operating requirements of the actuator are greatest at the start of the opening movement of the ram. At the same time, this arrangement facilitates rapid operation of the preventer as it enables the rams to be moved quickly into and out of closed position. Still further, this arrangement is particularly well suited to blowout preventers and similar valve apparatus since it provides a maximum of power in the final stages of the ram closing movement so as to seal the opposed rams firmly against one another.

The means for moving the rams also includes another crank arm on each shaft exteriorly of the body and an actuator having hydraulically extendible and retractable members connecting the exterior crank arms for rotating the shafts in directions to move the rams between opened and closed positions. In accordance with one novel aspect of the invention, the actuator is removably connected to the exterior crank arms to permit its replacement separately of the interior crank ram actuators, and thereby adapt the preventers to different power requirements or permit the use of other types of actuators. In accordance with still another novel concept, a rod is rotatably carried by one member and has a part thereon movable longitudinally into abutment with the other member to hold the rams in closed position.

The actuator may include a cylinder connected to one of the rams and a piston connected to the other ram and slidable within the cylinder. In one form, the rod is carried by the cylinder and fixed against longitudinal movement with respect thereto, and the part for holding the rams in closed position is threadedly mounted on the rod for movement longitudinally therealong, upon rotation of said rod, into abutment with the piston. Alternatively, in another form, the rod is threadedly mounted on the cylinder for movement longitudinally with respect thereto, and said part is movable with the rod into abutment with said piston.

On the other hand, the actuator may include a cylinder connected to each ram and a rod having spaced apart pistons slidable within the cylinders. In this case, the first-mentioned rod is carried by and fixed against longitudinal movement with respect to one of the cylinders, and the part for holding the rams in closed position is threadedly connected to the rod for movement longitudinally into abutment with the other cylinder.

In the drawings, wherein like reference characters are used throughout to designate like parts.

Figure 1:
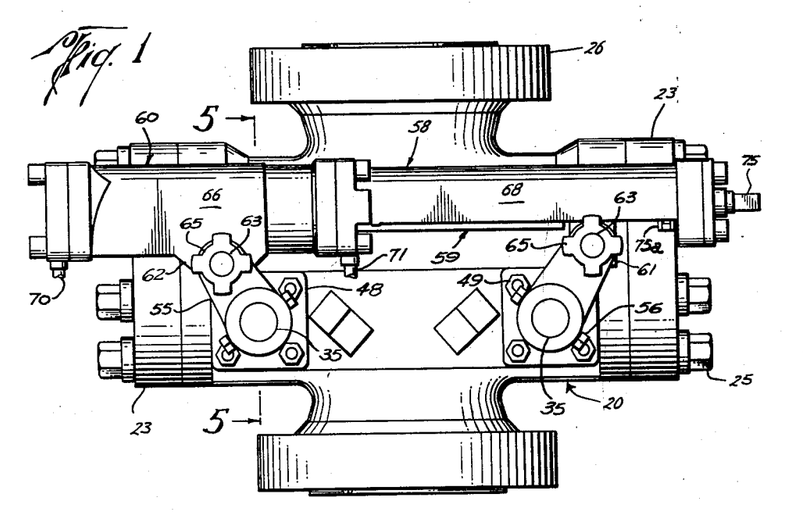
FIG. 1 is an elevational view of a blowout preventer constructed in accordance with the present invention.
Figure 2:
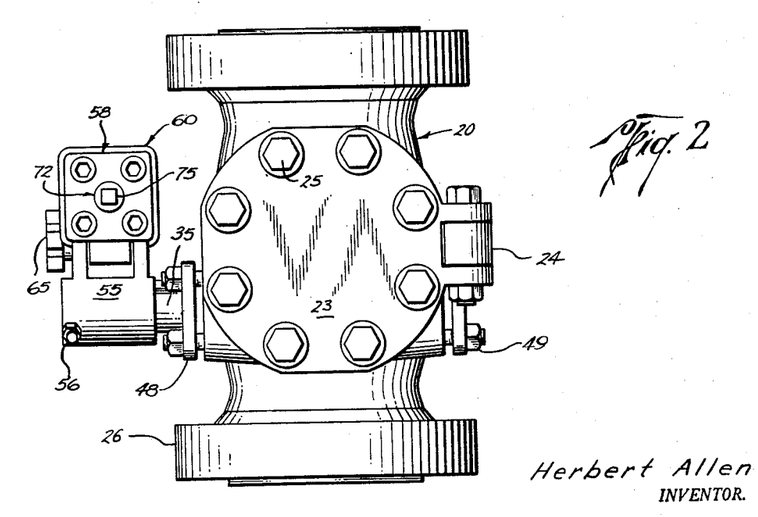
FIG. 2 is a right end view of the preventer of FIG. 1.

Referring now to the above-described drawings, the blowout preventer of the present invention, which is shown in its entirety in FIGS. 1 and 2, comprises a body 20 having a bore 21 therethrough (see FIGS. 7 to 9) and guideways 22 therein intersecting opposite sides of the bore. A bonnet 23 is hingedly connected at 24 (see FIGS. 2 and 9) to each opposite end of the body 20 for swinging between positions closing the outer end of each guideway 22 and opening same, as shown in FIG. 9. A sealing element is received within an annular groove 23a in the inside surface of each bonnet for sealing about the guideway 22 in each end of the body. In its closed position, each bonnet 23 may be secured to the body by means of bolts 25. Each of the top and bottom of the body is provided with a flange 26 for connection with another wellhead fitting (not shown) having a bore therethrough adapted to form a continuation of the bore 21. As previously noted, and as will be understood more fully from the description to follow, the body is of such simplified construction, both internally and externally, that it may be forged.

Figure 3:
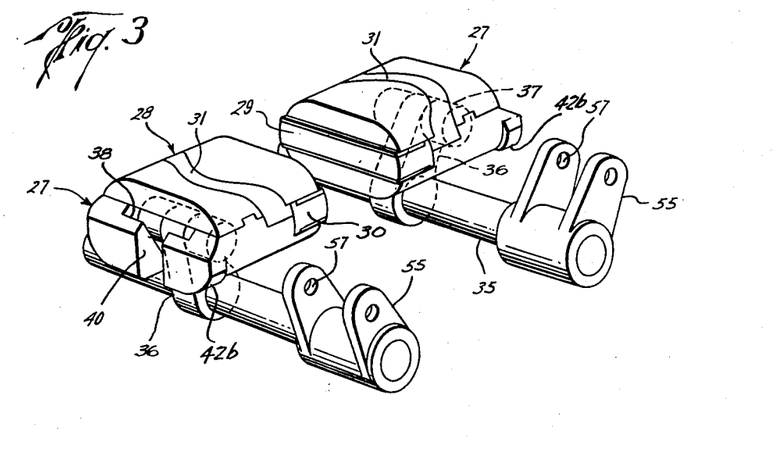
FIGS. 3 and 4 are perspective views of the rams of the preventer and parts of the actuator therefor, removed from the preventer and in opened and closed positions, respectively.
Figure 4:
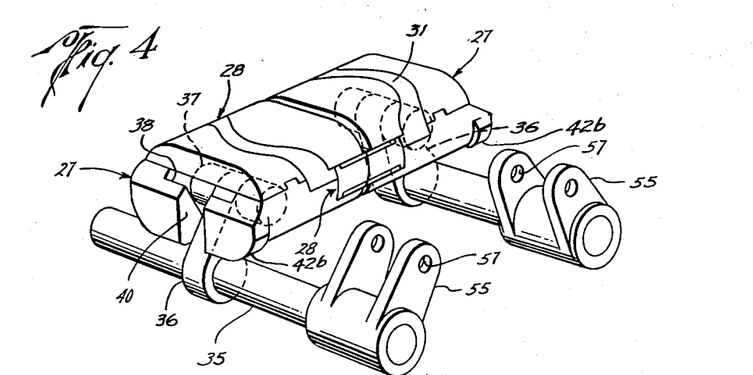
Figure 7:
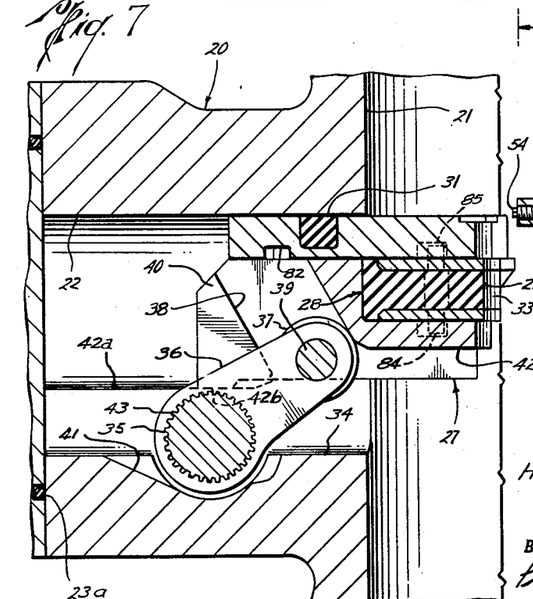
FIG. 7 is a longitudinal sectional view of one end of the preventer and showing a ram thereof in closed position.
Figure 8:
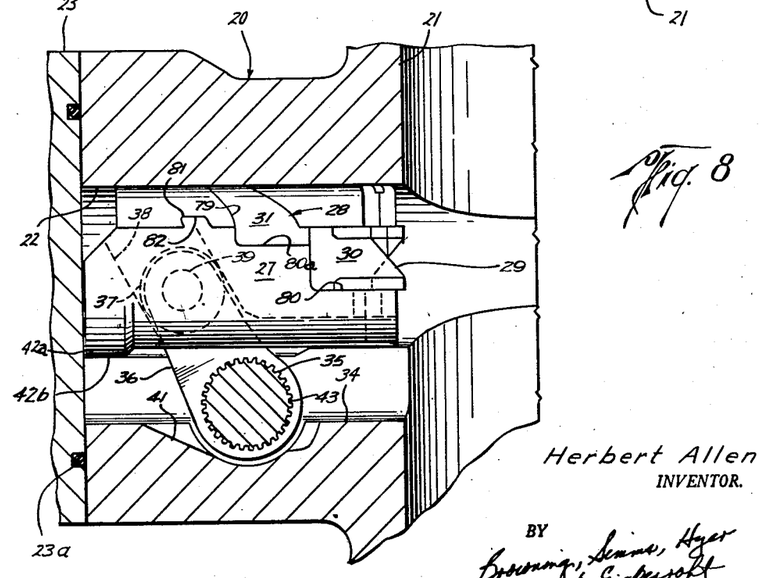
FIG. 8 is a view similar to FIG. 7, but showing the ram in side elevation and in opened position.
Figure 9:
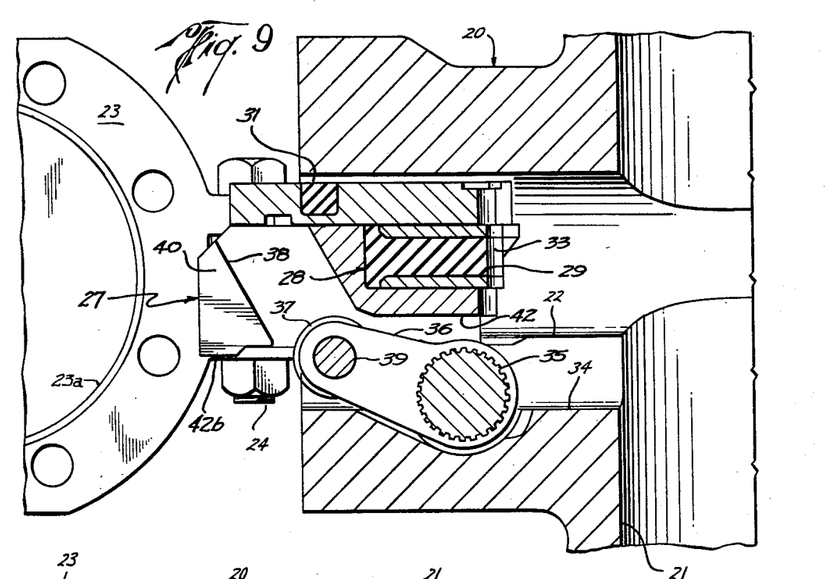
FIG. 9 is a view similar to FIG. 7, but with the bonnet moved to an open position and the ram moved to another position in which it is received within the relieved portion of the guideway and the one end of the crank is moved through the open end of the slot therein to permit the ram to be removed from said guideway.
Figures 14, 15:
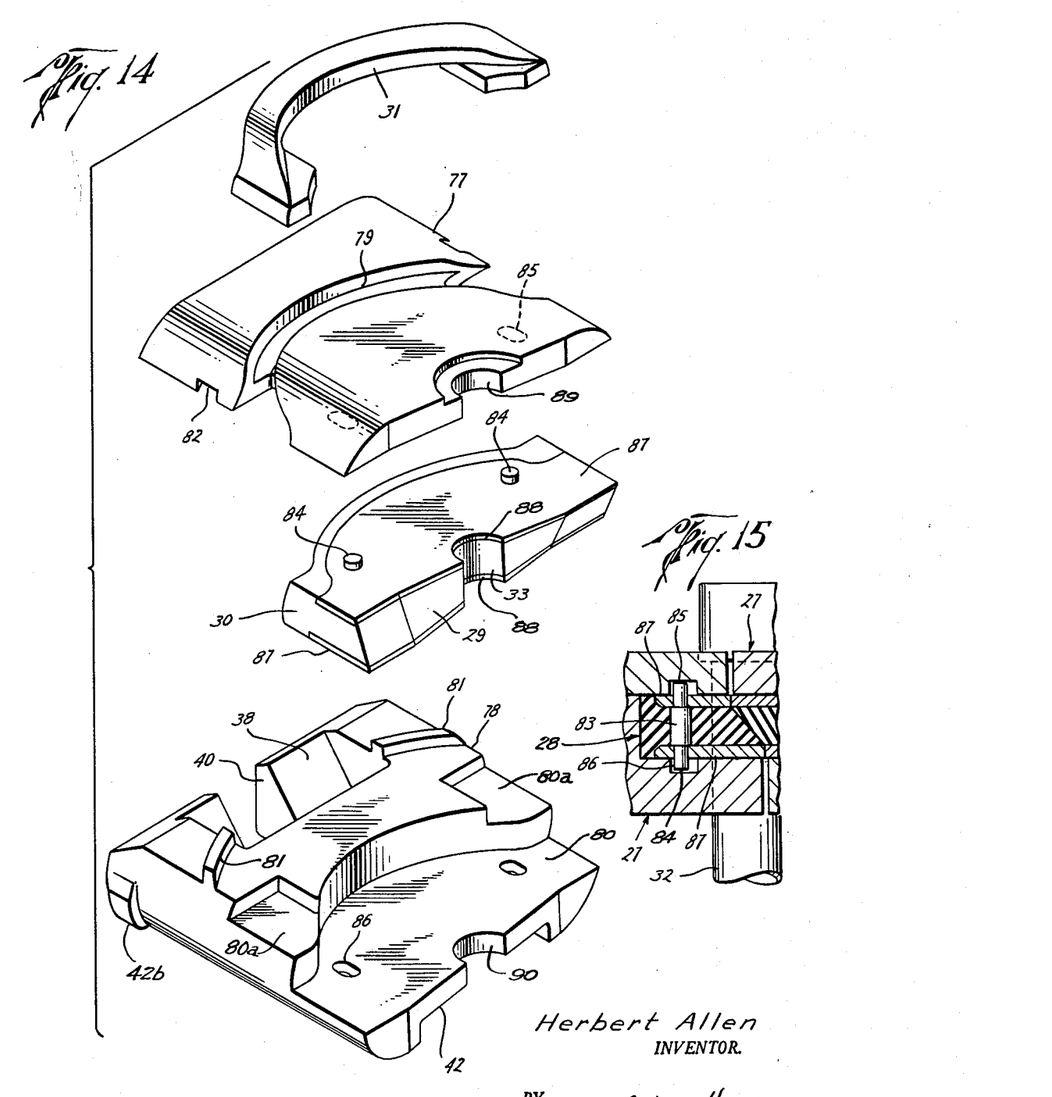
FIG. 14 is an exploded view of one of the rams.
FIG. 15 is a partial sectional view of the inner abutting ends of opposed rams in fitted position about a pipe within the bore of the preventer body.

A ram 27 is closely fittable within each of the guideways 22 for movement between a closed position in which its inner end is extended across the bore 21 (FIG. 7) for engagement with the inner end of the ram movable within the opposite guideway, as shown in FIGS. 4 and 15, and an open position (FIG. 3), in which its inner end is retracted from the bore so as to provide a full opening therethrough, as best shown in FIG. 8. Each such ram is provided with resilient sealing means 28, such as rubber, having a portion 29 extending laterally across the inner end of the ram for sealing engagement with a similar portion of the opposite ram, portions 30 at opposite sides of the ram for sealing engagement with opposite sides of its guideway, and a still further portion 31 extending laterally across the upper side of the ram between the rearward ends of portions 30 for sealing engagement with the top or upper side of each guideway 22 in both the opened (FIG. 8) and closed (FIG. 7) positions of the ram. In this manner, the rams close off the bore 21 when they are moved into engagement with one another. When there is no pipe disposed within the bore of the blowout preventer body, the portion 29 of the sealing means may be flat, as shown in FIG. 3. On the other hand, when the rams are to seal about a pipe 32 within the bore, as shown in FIG. 15, the sealing portion 29 thereof is provided with a groove 33 having a radius adapted to fit closely about one-half of the pipe.

As best shown in FIGS. 7 to 9, the bottom or lower side of each of the guideways 22 is provided with a longitudinal recess or slot 34 which provides access for the fluid within the bore 21 beneath the closed rams to the outer ends of the rams. Thus, as previously mentioned, the force due to the pressure of this fluid, which will be well fluid in the case of the blowout preventer, will urge the rams toward closed position. Since, in the closed position of the rams, the inner ends thereof are sealed with respect to one another along portions 29, there will be a pressure differential acting across the rams which will aid in maintaining them in closed position.

A shaft 35 is mounted on the body on each side of the bore 21 for rotation about an axis offset from the guideway 22 and transverse to the direction of movement of the ram 27. A crank arm 36 on each shaft is provided with rollers 37 on one end thereof which are receivable within a slot 38 in a ram for moving said ram longitudinally within its guideway in response to rotation of the shaft. More particularly, the portion of crank arm 36 intermediate the shaft 35 and a shaft 39 which mounts the rollers 37 is swingable within recess 34 as well as portion 40 of the slot 38 which opens onto the outer end of the ram. The slot 38 in each ram also opens to the lower side or bottom thereof to permit the rollers 37 on the end of the crank arm 36 to swing through the open end of the slot and out of engagement with the ram into the position shown in FIG. 9 so that the ram may be removed from the outer end of the guideway. Obviously, when the crank arm is swung into this position, the rollers are disposed in a position for easy entry into the slot as the ram is moved back to the position of FIG. 8.

In order to facilitate disengagement of each crank arm from its ram, each recess 34 of the body is relieved at 41 beneath the shaft 35, and the lower side or bottom of each of the rams is provided with a longitudinal slot 42 extending from the slot 38 to the inner end of the ram. As shown in FIG. 8, each ram 27 is movable to its open position with the outer end of the guideway 22 closed by the bonnet 23. However, upon release of the bolts 25 and swinging of the bonnet 23 about its hinge 24, the shaft 35 may be swung from its position of FIG. 8 in a counterclockwise direction so as to move the ram from its closed position to another position in which its inner end is further retracted from the bore 21 and its outer end projects from the open outer end of the guideway a sufficient distance to facilitate its manual removal to a position such as shown in FIG. 9, or completely out of the guideway.

The outer end of the lower side of each guideway is provided with a relieved portion 42a for loosely receiving the ram 27 when it is moved outwardly from the open position of FIG. 8 to the other position above-described in which the slot is disengaged therefrom and its outer end projects from the outer end of the guideway. More particularly, each ram is provided with a shoulder 42b on the outer end of its lower side which slides within the relieved portion 42a during movement of the ram between opened and closed positions. This prevents the ram from tilting and maintains its close fit in its opened and closed positions, particularly when subjected to well pressure in its closed position. However, as the ram is moved to the other position, and the roller 37 moves through the open end of the slot 38, the shoulder 42b moves out of and the inner end of the ram moves into the relieved portion 42a.

Since the sealing strip 31 on the ram is disposed on the top side thereof opposite the lower side received within the relieved portion of the guideway, this movement of the ram not only loosens its close fit but also breaks its seal with respect to the guideway and relieves the frictional forces with respect thereto. Thus, the ram is pulled from the guideway with ease, the slot 42 therein enabling it to clear the rollers 37.

In the embodiment shown in FIGS. 7 to 9, the opposite sides of the slot 38 in the ram are flat and extend in directions which form acute angles with the direction of movement of the ram. As will be understood from the description to follow, these sides need not necessarily be parallel. More particularly, the sides of each ram slot are so arranged with respect to the crank arm 36 as to dispose the axes of rotation of shafts 35 and 39 in a plane substantially parallel to the rear side of the slot in the open position of the ram, and substantially perpendicular to the forward side of the slot in the closed position of the ram. Thus, as previously explained, this actuator for the rams provides a relatively large amount of force for moving the rams toward the end of their closing and at the start of their opening movement, and a relatively large average rate of movement longitudinally of the guideway during the remainder of its opening and closing movements. It is contemplated that, in the closed position of the ram, the above-mentioned plane through the axes of rotation of shafts 35 and 39 will be somewhat less than perpendicular to the forward side of the ram slot 38 so as to make allowance for wear upon sealing strip portion 29. Thus, for example, if the sides of the slot 38 were disposed at an angle of about 30 degrees to the vertical, the plane between the axes of shafts 35 and 39 may, in the closed position of the ram, form an angle of about 35 degrees or more with respect to the horizontal.

It will further be understood that although there may be a certain diminishment of the rate of movement of the ram between the open position of FIG. 8 and the position in which the rollers 37 move through the opening from the lower side of the ram slot and the ram moves into the relieved portion 42a of the guideway, this rate of movement will still be relatively large when compared with that of the ram toward the end of its closing and start of its opening movement.

Figures 10, 11, 12, 13:
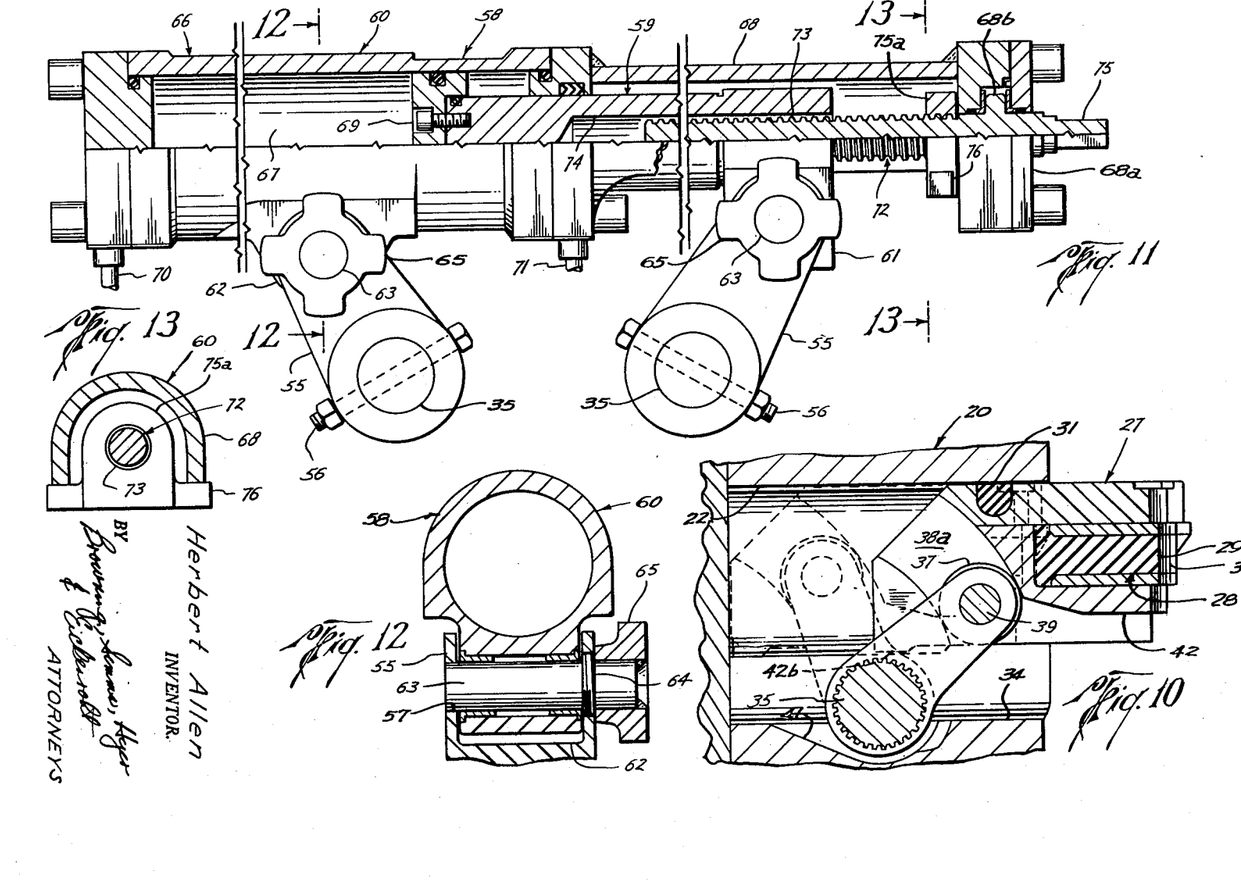
FIG. 10 is a view, similar to FIGS. 7 and 9, of a modified ram, shown in opened position by solid lines and in closed position by broken lines.
FIG. 11 is a side view, partly in section, of the extendible and retractable actuator of FIGS. 1 and 2 and the external crank arms when the rams are in opened position.
FIG. 12 is a cross-sectional view of the external portion of the actuator, taken substantially along broken lines 12—12 of FIG. 11.
FIG. 13 is another cross-sectional view of the external portion of the actuator, taken substantially along broken lines 13—13 of FIG. 11.

In the ram embodiment of FIG. 10, the opposite sides of the ram slot 38a are curved. This may be desirable, for example, in order to provide a somewhat different relation of force to rate of movement, during opening and closing of the rams, than would exist in the case of the straight-sided slot 38 of FIGS. 7 to 9. These changes are, however, believed to be within the scope of one skilled in the art, and generally the slot arrangement of FIG. 10 corresponds to that of FIGS. 7 to 9. Thus, in the closed position of the ram, as it is shown in solid lines in FIG. 10, a plane through the axes of shafts 35 and 39 may extend in a direction substantially perpendicular to a plane tangent to the intersection of rollers 37 with the forward side of the slot 38a, thus providing a relatively large amount of force toward the end of the closing and at the start of the opening movement of the ram. On the other hand, in the open position of the ram, as shown in broken lines in FIG. 10, this plane may extend in a direction substantially parallel to a tangent at the point of engagement of rollers 37 with the rear side of the slot 38a, for the purposes previously noted.

More particularly, the opposite sides of the slot 38 or 38a in each ram are sloped outwardly toward the side of the ram upon which the laterally extending sealing portion 31 is disposed. Thus, as the ram is moved from its closed to its open position, there will be a vertical component of force exerted by the rollers 37 of the crank arm 36 upon the rear side of the ram slot, the advantages of which will be more apparent from the description to follow of the modified ram shown in FIGS. 16 and 17.

Figure 5:
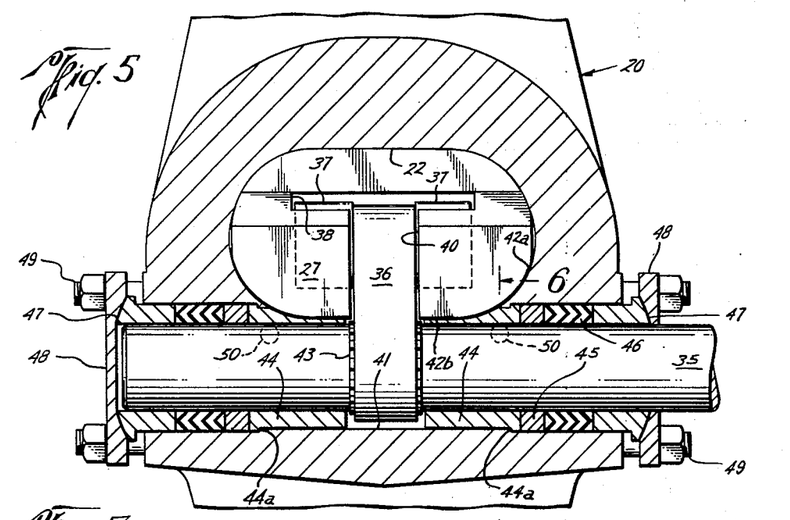
FIG. 5 is a cross-sectional view of the preventer on an enlarged scale, and as seen along broken lines 5—5 of FIG. 1.

As best shown in FIG. 5, the shaft 35 is sealably received within opposite sides of the ram body 20. Since there is no "piston effect," the only force which is to be overcome by the actuator during movement of the ram into closed position is that due to friction. One end of the shaft 35 extends through one side of the body for connection with an exterior portion of the actuator which includes means for rotating the shaft, as will be described hereinafter.

Each crank arm 36 is splined at 43 to its shaft 35, and each shaft is carried for rotation but maintained against longitudinal movement by means of bearings 44 surrounding the shaft on opposite sides of the splined portion thereof and received within openings in each side of the body. The bearings 44 are, in turn, held against outwardly facing shoulders 44a in the body openings by means of a sealing assembly which includes an annular ring 45 disposed about the shaft adjacent the outer end of the bearing, an annular packing 46 about the shaft adjacent the ring, and a gland nut 47 for the packing. As shown in FIG. 5, each gland nut is held tightly in place by means of a cap 48 bolted as at 49 to the side of the preventer body. One of the caps 48 is provided with an opening therethrough to receive the outwardly extending portion of the shaft 35.

Figure 6:
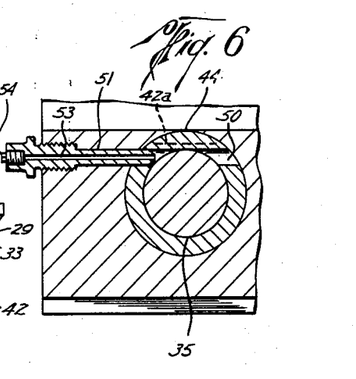
FIG. 6 is a sectional view, taken substantially along broken line 6—6 of FIG. 5, of the shaft of the actuator for each ram.

As best shown in FIG. 5, the relieved portion 42a of each guideway 22 extends in part into the upper portion of each of the bearings 44. As shown in FIG. 6, each bearing 44 is fixed in place within the body opening by means of a pin 51 threadedly connectable to the body with its inner end received within an opening 50 in the bearing and its outer end receivable within a recessed portion (not shown) of the bonnet 23. Each pin 51 may also be provided with an opening 53 therethrough and a fitting 54 in its outer end to permit lubrication of the shaft and bearings.

From the foregoing, it is obvious that the bolts 49 and pins 51 are releasable to permit removal of the cap 48 as well as the sealing assembly and bearing 44 upon the side of the preventer body adjacent the means for rotating the shafts of the actuator, so that each shaft 35 may be removed from its splined connection with the crank arm 36.

As best shown in FIGS. 3, 4 and 11, the external portion of the means for actuating the rams includes a crank arm 55 releasably connected, as at 56, to the outwardly extending portion of each shaft 35, and an actuator 58 pivotally connected at opposite ends to the outer end of each of the crank arms. The actuator 58 is extendible and retractable, in a manner to be described hereinafter, so as to vary the distance between said ends of the crank arms 55 and thereby rotate the shafts 35 in a manner to move the rams 27 between opened and closed positions. Thus, with reference to FIGS. 3 and 4, it will be understood that when the actuator 58 is retracted, the crank arms 55 will be moved to a position of FIG. 4 so as to close the rams and, when the actuator 58 is extended, as shown in FIG. 11, the crank arms 55 are swung in a direction to open the rams. As best shown in FIGS. 3 and 4, each crank arm comprises a yoke having openings 57 through the outer ends thereof for releasable connection with the actuator 58, in a manner to be described below.

It will be seen from FIG. 4 that in the closed position of the rams, the crank arms 55 form a substantial angle with respect to the horizontal so as to provide a relatively large moment arm for rotating the shafts during the start of the opening movement of the rams. For this purpose, the crank arms 55 may lag the interior crank arms 36 to a certain amount, such amount to be governed by the over-all rotative movement of the interior crank arms 36 between the position they assume in closing the rams and the position they assume in releasing the rams (FIG. 9).

As best shown in FIG. 1, it is contemplated that one of the external crank arms 55 (the rightmost) is longer than the other. Thus, there will be more torque available for rotating the shaft 35 to which the longer arm is connected than for rotating the other shaft, so that the ram actuated by the longer arm and its shaft will be moved from closed position before the other ram. Since this initial movement of one of the rams releases the pressure differential across both rams, the other ram requires less torque for moving it to its open position. Therefore, this arrangement enables the power requirements of the actuator to be less than they would be if the crank arms 55 were of equal lengths totaling the length of the arms illustrated.

In the illustrative embodiment shown in FIGS. 1, 2 and 11 to 13, the actuator 58 comprises a piston 59 connected to one of the crank arms (the rightmost in FIG. 11) and movable within a cylinder 60 connected to the other crank arm 55 (the leftmost in FIG. 11). More particularly, the stem of the piston 59 is provided with a dependent support 61 and the cylinder 60 with a depending support 62, each having an opening therethrough to receive a pin 63 pivotally connecting said piston and cylinder to the crank arms 55. As shown in FIG. 12, the pin 63 is provided with a portion 64 threadedly received within one arm of the yoke making up crank arm 55, and its outer end is provided with a hammer lug head 65. Thus, when it is desired to remove the extendible and retractable actuator 58 from the crank arms 55, the head 65 upon each of the pins 63 may be given a hard blow to loosen the threads 64, whereupon the pin is easily and quickly removable from the yoke and the opening through the support.

As shown in FIG. 11, the cylinder 60 includes a first portion 66 which is closed at opposite ends to define a pressure chamber 67 therein and a second portion 68 extending longitudinally of the portion 66 above the piston 59. This second portion 68 is open along its lower side so as to accommodate movement of the support 61 on the piston 59. A piston head 69 on the stem of the piston 59 is sealably slidable within pressure chamber 67 and conduits 70 and 71 are connected to the cylinder 60 for communication with the pressure chamber 67 at opposite sides of the piston head 69. Thus, the piston 59 may be reciprocated with respect to the cylinder by a suitable hydraulic system (not shown), in a manner well known in the art.

As also shown in FIG. 11, a rod or locking screw 72 is received for rotation within the rightmost end 68a of the portion 68 of cylinder 60 and is held against longitudinal movement with respect thereto by means of an annular collar 68b along an intermediate portion thereof. An inner threaded end 73 of the rod 72 extends within a hollowed out portion 74 of the piston 59, and the outer end thereof is provided with a non-circular part 75 to facilitate rotation of the screw for a purpose to be described.

A part 75a is received about the threaded inner end 73 of the rod and is provided with flanges 76 on each opposite side for sliding engagement over the open lower side of the portion 68 of the cylinder, as shown in FIG. 13. Thus, upon rotation of the rod 72, the part 75a is moved longitudinally of the rod and cylinder and into and out of abutment with the outer end of the piston 59. When the piston and cylinder are in their retracted position (FIG. 4), the part 75a may be moved into abutment with the piston so as to hold the rams in their closed position. On the other hand, it is contemplated that this locking screw may be used to move the ram from an opened to a closed position when, for example, there is a power failure in the hydraulic system for reciprocating the piston within the cylinder.

Turning now to a description of the rams 27, it will be seen from FIG. 14 that the sealing means 28 of each is made up of separate strips, one such strip comprising laterally extending portion 31 and the other such strip comprising portion 29 extending laterally across the inner end of the ram and portions 30 extending along the sides thereof between inner portions 29 and laterally extending portion 31. The function of these sealing strips with respect to the ram guideway has previously been described.

The remainder of the ram is made up of an upper plate 77 and a lower plate 78. As shown in FIG. 14, the upper plate is provided with a groove 79 thereacross for receiving part of the sealing portion 31, and the slot 38 of each ram including the opening 40 therefrom is formed in the lower plate 78. The sealing strip which is made up of portions 29 and 30 is received between the inner end of top plate 77 and a shelf 80 on the inner end of bottom plate 78. The bottom plate is also recessed at 80a to receive the opposite lower ends of the strip made up of sealing portion 31.

The top and bottom plates 77 and 78 are held against relative longitudinal movement by means of a projection 81 on the top side of the bottom plate 78 which fits within a groove 82 on the bottom side of the top plate 77. On the other hand, longitudinal movement of portion 29 of the forward sealing strip relative to the top and bottom plates 77 and 78 is limited by means of a pair of pins 83 carried by said strip and having outwardly extending portions 84 on both sides thereof received within elongated grooves 85 and 86 in the top and bottom plates, respectively. Obviously, this strip is replaceable upon lifting of top plate 77 from lower plate 78.

It is also contemplated that the sealing portion 29 will project slightly outwardly from the inner faces of the top and bottom plates to provide an excess of resilient material which will insure a tight seal between the ram faces and between the rams and guideways as the two rams are movable into engagement with one another. Furthermore, this outwardly projecting part of sealing portion 29 is confined against flowing between the inner faces of the rams by means of retainer plates 87 which are held between the top and bottom plates and the top and bottom sides of such portion. As shown in FIGS. 14 and 15, the pins 83 are also extended through the plates 87 so that they will move with the sealing portion 29. From a comparison of FIGS. 7 and 15, it will be understood that as the rams are forced into engagement with one another and the face of the sealing portion 29 of each is moved rearwardly to distort the resilient material of the forward strip and force portion 31 into sealing engagement with the guideway, the projecting portions 84 of the pins 83 will be moved rearwardly within the slots 85 and 86.

It will be understood that the close fit of the various parts of each ram within its guideway will hold them against separation until such time that they are removed therefrom. Thus, of course, they may be easily and quickly assembled and disassembled.

As best shown in FIG. 14, the face of each of the retainer plates 87 is grooved at 88 to form continuations of groove 33 in sealing portion 29, and top and bottom plates 77 and 78 are grooved at 89 and 90, respectively, in axial alignment with grooves 33 and 88, but spaced rearwardly thereof in the open position of the rams to accommodate the above-described movement of the sealing portion 29 relative to the plates as the rams are moved into engagement with one another and about the pipe 32.

Except in the case of the "blind" rams of FIGS. 3 and 4, the faces of the rams may be formed in a manner to guide the pipe 32 into the aforementioned grooves as the rams are moved into closed position. Thus, the faces on the inner ends of the top and bottom plates and the retainer plates of each ram at each side of the grooves therein and above and below the sealing portion 29, respectively, form oppositely disposed angles with respect to a plane perpendicular to the longitudinal axis of the ram. More particularly, these faces on each ram are flat and parallel to corresponding faces on the other ram, and the face of sealing portion 29 on opposite sides of groove 33 therein is contoured for uniform sloping outwardly from the groove in oppositely disposed and increasing angularity with respect to the axis of said groove. These skewed faces may extend over all or part of the ram, as shown in FIG. 14.

Obviously, these ram faces will form converging V shaped spaces on both sides of the grooves as the rams are moved into closed position so that, even if pipe 32 is initially out of alignment with the axis of the preventer bore, it will be guided toward the grooves.

Figure 16:
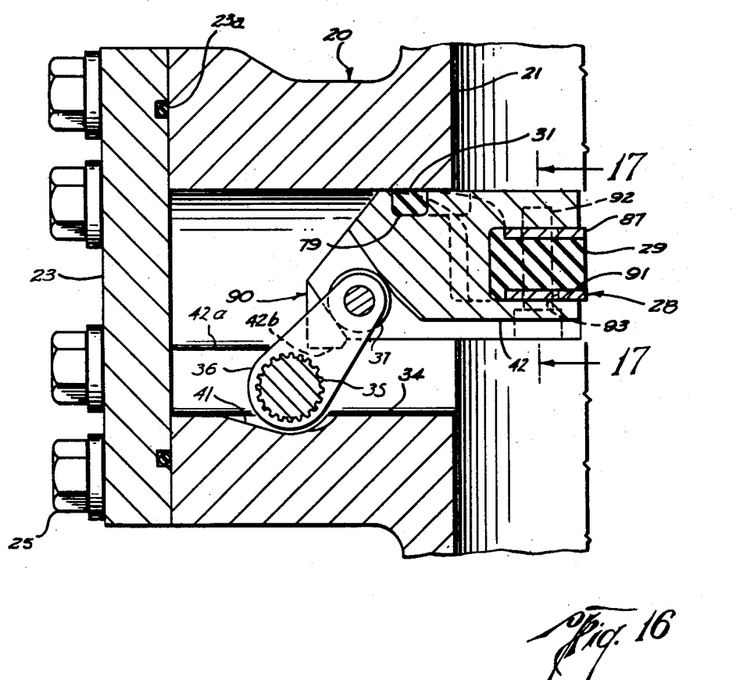
FIG. 16 is a longitudinal sectional view, similar to FIG. 7, of another modified embodiment of a ram constructed in accordance with this invention.
Figure 17:
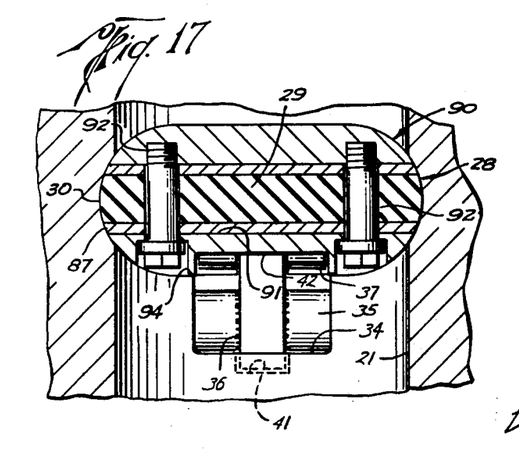
FIG. 17 is a cross-sectional view of the ram of FIG. 16, taken substantially along broken line 16—16 thereof.

The modified ram 90 shown in FIGS. 16 and 17 may correspond in substantially all respects to the rams 27, except that the portion of the body thereof which supports the sealing portion 31 is integral with or at least fixedly connected to that portion of the body in which the slot 38 is disposed. Thus, the aforementioned vertical component of force of the rollers 37 upon the rearside of the slot will tend to pull sealing portion 31 away from the top side of the guideway 22 so as to facilitate movement of the ram 90 from its closed position of FIG. 16 toward its open position. As previously mentioned, this is particularly advantageous at the start of the opening movement of the ram.

As shown in FIG. 16, the one-piece body of the ram is provided with a slot 91 across its inner end or face to receive the sealing portions 29 and 30 of the resilient sealing means 28, and a slot 79 across its upper side to receive the sealing portion 31 thereof. These portions of the sealing means 94 cooperate with one another and the guideway 22 to seal off the bore 21 of the preventer body. Although the ram is shown to be a "blind" similar to those of FIGS 3 and 4, it may, of course, be grooved to fit about a pipe.

As in the case of the previously described rams, the sealing means 28 of the ram 90 includes a forward sealing strip made up of sealing portions 29 and 30 and a rearward strip comprising sealing portion 31. The forward strip is held for limited longitudinal movement within the slot 91 by means of pins 92 received through such strip as well as retainer plates 87 for threaded engagement with the body above the slot. As shown in FIG. 16, the openings 93 for the pins 92 through the retainer plates are enlarged to permit said movement. As shown in FIG. 17, the heads of the pins 92 are received within recessed portions 94 in the bottom of the ram so as not to interfere with movement of the ram within the guideway 22.

The operation of the blowout preventer of this invention is believed apparent from the foregoing description. Thus, for example, assuming that a pipe 32 was disposed within the bore 21 of the preventer body and it was desired to close off the well about the pipe, hydraulic fluid would be supplied through conduit 71 to the pressure chamber 67 behind piston head 69 and withdrawn through conduit 70 from the pressure chamber in front of the piston head in order to move the piston 59 to its retracted position within the cylinder 60. This, in turn, would swing the exterior crank arms 55 to rotate the shafts 35 in directions for moving the rams to closed position. Since the internal crank arms 36 are swung by the shafts 35, it is not necessary for the power system to overcome any "piston effect." Furthermore, although the rams would be moved initially at a relatively high rate, toward the end of their closing movement, the rollers 37 of the crank arms 36 would exert a relatively large force thereon due to the previously described arrangement of the crank arms with respect to the ram slots 38. This large force, augmented by well pressure behind the rams, would be particularly advantageous in distorting the flowable material of the sealing means as the rams are moved into engagement with one another.

When it is desired to open the bore of the preventer body about the pipe 32, hydraulic fluid is introduced into the pressure chamber 67 at the front of piston head 69 and withdrawn from the chamber behind the piston head to move the piston 59 to its extended position with respect to the cylinder 60. With the bonnets 23 closing the outer end of each guideway 22, the rams will thus be retracted into the open position shown in FIG. 8. During the initial portion of this opening movement, the rollers 37 of the crank arms 36 will exert a relatively large force upon the rams, which is particularly advantageous at this stage as the rams are held tightly in engagement with one another due to a pressure differential thereacross resulting from the exposure of the outer ends of the rams to well pressure. After this initial opening movement and separation of the faces of the rams from one another, so as to equalize the pressure thereacross, the rams will be moved at a relatively fast average rate.

When it is desired to replace one or both of the rams or parts thereof, one of the bonnets 23 is released and swung to the open position of FIG. 9. The actuator 58 is at this time further extended to swing the crank arm 36 for the ram within the open guideway from the position of FIG. 8 to a position in which the rollers 37 on the arm have forced the ram to a position in which its outer end projects from the outer end of its guideway. Further movement of the crank arm 36 will cause the rollers 37 to move through the opening from the lower side of the ram slot 38 so that the crank arm 36 is disengaged from the ram. At the same time, shoulder 42b on the ram is moved out of the guideway and the ram drops into relieved portion 42a. This disengagement of the actuator from the ram, as well as the loose fit of the ram within the guideway, enables it to be moved manually to a position projecting still further from the guideway, as shown in FIG. 9, or completely removed from the guideway.

When the first ram has been replaced, the actuator is retracted so as to reengage the rollers 37 within the slot 38 and return the ram to the position of FIG. 8. The bonnet 23 is then swung to its closed position and bolted to the body. At this time, the bonnet 23 at the other end of the body is released and swung to a position opening the other guideway, whereby the other ram may be replaced in the manner above-described.

Obviously, upon replacement of one or more of the parts of the rams, they may be moved back into the guideways such that the crank arms may be engaged with the slots therein for moving them between opened and closed positions during normal operation of the preventer.

The rod or locking screw 72 of the actuator 58 enables the rams to be locked in closed position, and also provides a means for moving the rams from opened to closed positions in the case of a power failure. This actuator 58 is removable in its entirety from the remaining portion of the ram actuators upon removal of pins 63 connecting such actuator to the external crank arms 55.

Figures 18, 19:
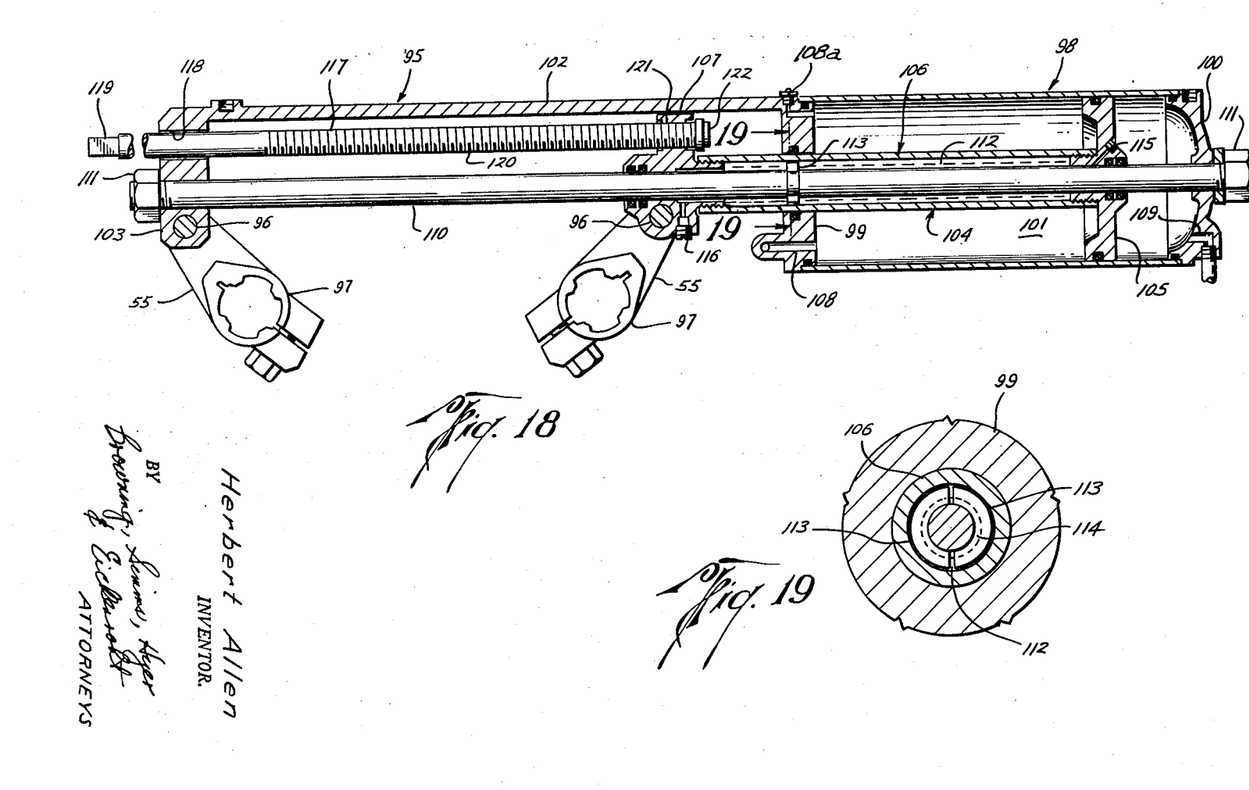
FIG. 18 is a longitudinal sectional view of the alternative form of actuator and the external crank arms, also arranged to dispose the rams in opened position.
FIG. 19 is an enlarged cross-sectional view of the actuator of FIG. 18, taken substantially along broken line 19—19 of FIG. 18.

The form of actuator 95 shown in FIGS. 18 and 19 is connected to the free swinging ends of the external crank arms 55, which are releasably connectable to the outer ends of shafts 35, as shown in FIGS. 1 and 2, by means of suitable clamps 97 or the like on their opposite ends. More particularly, this form of actuator includes a cylinder 98 having a first portion which is closed at its opposite ends by means of cylinder heads 99 and 100 to form a pressure chamber 101 therebetween, and a longitudinal extension 102 on the first portion having a depending portion 103 forming a bearing for a pin 96 pivotally connecting the left most crank arm 55 to the cylinder. A piston 104 includes a head 105 sealably slidable within the pressure chamber 101 and a stem 106 connected at one end with the head 105 and extending through cylinder head 99 for connection with a body 107. The latter provides a bearing for another pin 96 pivotally connecting the piston to the rightmost crank arm 55.

Thus, as the piston and cylinder are retracted with respect to one another to move piston head 105 toward cylinder head 99, the crank arms 55 will be swung inwardly toward one another for moving the rams to closed position. On the other hand, as the piston and cylinder are extended with respect to one another to move the head 105 of the piston toward the cylinder head 99, the crank arms 55 will be swung away from one another, as shown in FIG. 18, to move the rams to opened position. Additional extension of the piston and cylinder enables still further movement of the rams away from one another into a position from which they will be removed from their respective guideways in the manner previously described.

Ports 108 and 109 connect the exterior of the cylinder with the pressure chamber 101 for admitting and withdrawing hydraulic fluid to and from opposite sides of the piston head 105 for moving the piston and cylinder with respect to one another in an obvious manner. A bleed port 108a connects with the interior of the chamber on the left side of the piston head 105. A rod 110 extends longitudinally of the piston and cylinder and is provided with a nut 111 at each end thereof for bearing against the outer sides of depending portion 103 and the cylinder head 100. As shown in FIG. 18, the rod 110 extends through the piston 104 to provide an annulus 112 which is closed at one end by the body 107 and at the other end by the piston head 105. More particularly, the annulus is filled with a suitable lubricant, and split rings 113 are received within a recessed portion 114 about the rod. As will be understood in connection with FIG. 19, the rings restrict the flow of lubricant therepast within the annulus, during reciprocation of the piston with respect to the cylinder, so as to reduce the speed of such reciprocation. Lubricant may be introduced into the annulus 112 through either of the connections 115 or 116.

Another longitudinally extending rod 117 is freely carried within an opening 118 in the depending portion 103 of the cylinder extension for rotation and movement longitudinally with respect thereto. The outer end of this rod is provided with a non-circular part 119 for connection with a suitable tool for rotating same, and the inner end thereof is threaded at 120 for connection with a threaded opening 121 in the body 107 of the piston 104. Thus, the rod 117 may be rotated in opposite directions for moving the surface 122 on its inner end toward and away from the outer side of cylinder head 99. In this manner, the rod 117 can be manipulated to limit the extension of the piston and cylinder with respect to one another. More particularly, when the piston and cylinder are retracted so as to move the rams to closed position, the rod 117 may be turned to a position in which the surface 122 thereof engages with the cylinder head 99 to hold the rams in such position.

Figure 20:
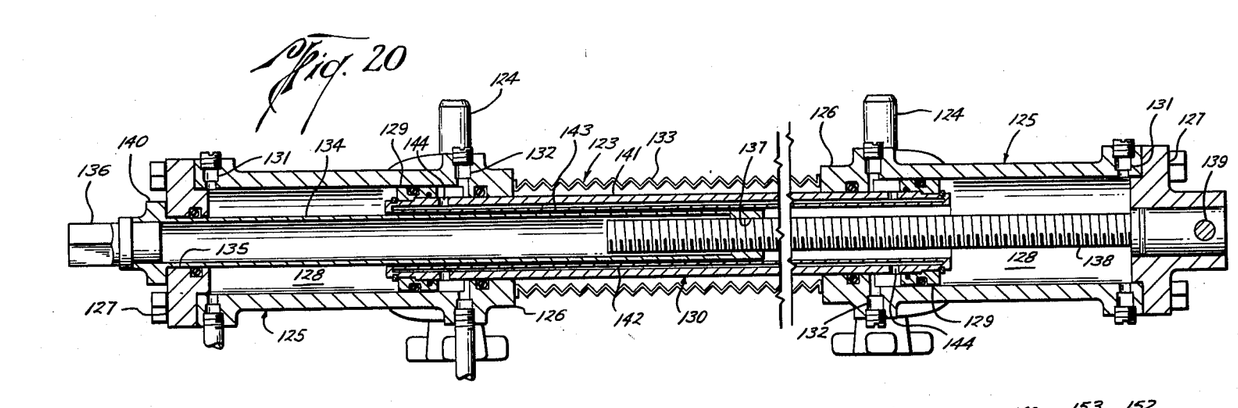
FIG. 20 is a longitudinal sectional view, as seen from the top, of the next described form of actuator.

In the form of actuator 123 shown in FIG. 20, each of the pins 124 for pivotal connection with an external crank arm (not shown) is connected to a cylinder 125, each such cylinder having an inner cylinder head 126 and an outer cylinder head 127 to form a pressure chamber 128 therebetween. Pistons 129 are connected in spaced apart relation on each end of a rod 130 for reciprocation within each of the cylinders 125, whereby the cylinders may be extended and retracted with respect to one another for moving the pins 124, and thus the rams, toward and away from one another. Ports 131 and 132 are provided to connect the exterior of each of the cylinders with the interior thereof on opposite sides of the piston 129 so as to extend and retract the cylinders in a manner to be described.

The exterior portion of the rod 130 as well as the seals between the rod and the cylinders 125 are protected against debris by means of an accordion-type cover 133 surrounding the rod and anchored at its opposite ends to the cylinder heads 126.

A hollow rod 134 is rotatably mounted within an opening 135 in the cylinder head 127 of the leftmost cylinder for extension longitudinally of the cylinders and rod 130. The outer end of the hollow rod 134 is provided with a non-circular part 136 to facilitate its rotation by a suitable tool, and the inner end thereof is provided with a threaded opening 137 for connection with the threaded inner end of another rod 138 anchored at its outer end to the cylinder head 127 of the rightmost cylinder by means of a pin 139. The outer end of the hollow rod 134 is also provided with a collar 140 which is adapted to bear against the head 127 of the leftmost cylinder 125 so that, as the hollow rod is rotated in one direction, the cylinders 125 are forced toward one another. Thus, when the rams have been moved to closed position by retraction of the cylinders with respect to one another, the hollow rod 134 may be rotated in said one direction to move the enlargement 140 inwardly into engagement with the head 127 on the leftmost cylinder for locking the rams in such position.

The rod 130 connecting the pistons 129 is made up of two concentrically arranged tubular parts 141 and 142 which form an annulus 143 therebetween. Ports 144 in the outer part 141 connect the pressure chambers on the inner side of each of the pistons with one another through the annulus. On the other hand, the pressure chambers on the outer side of such pistons are connected by the annulus formed between the inner tubular part 142 and the outer diameter of the rod 134. Thus, hydraulic fluid may be introduced and withdrawn to and from the chambers through only one pair of ports 131 and 132, and the other ports may be plugged, as shown in FIG. 20.

Figure 21:
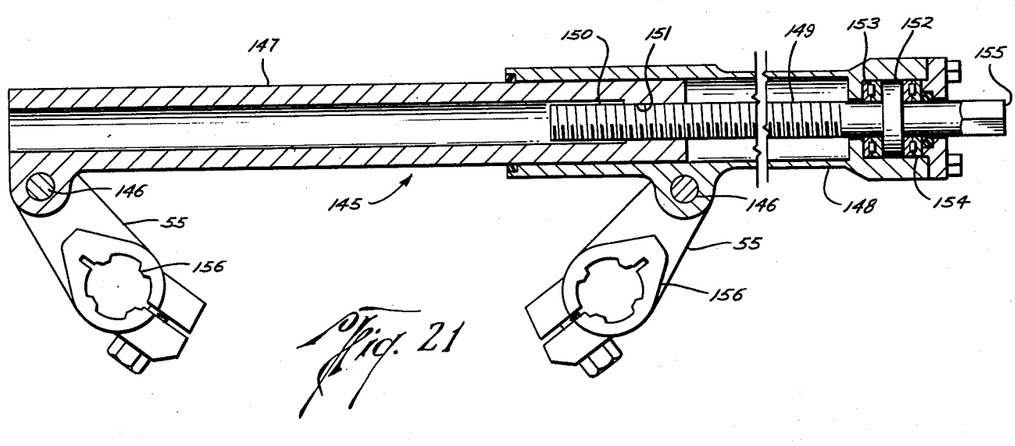
FIG. 21 is a longitudinal sectional view, similar to FIG. 18, of still another form of actuator.

In the form of actuator 145 shown in FIG. 21, the external crank arms 55 are pivotally connected to tubular members 147 and 148, respectively, by means of pins 146. The member 147 is guidably reciprocable within the tubular member 148, and a rod 149 is carried by the outer tubular member 148 for extension longitudinally of both members and rotation with respect to the outer tubular member 148. The inner end of this rod is threaded at 150 for connection with a threaded opening 151 in the inner end of inner tubular member 147. The outer end of the rod 149 is provided with a collar 152 which is held between bearings 153 and 154 housed within the outer tubular member so as to be fixed against movement longitudinally with respect thereto. Thus, as the rod is rotated by means of a non-circular part 155 on its outer external end, the inner and outer tubular members are caused to be extended and retracted with respect to one another for moving the rams between the desired positions.

As in the case of the form of actuator shown in FIGS. 18 and 19, the inner fixed ends of the crank arms 55 may be releasably connected to a shaft, such as shown at 35 in FIGS. 1 and 2, by means of clamps 156.

Obviously, each of the actuators shown in FIGS. 18 to 21 may be manipulated, in the manner described in connection with the actuator of FIGS. 11 to 13, to move the rams between opened and closed positions and another position for replacement.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matters herein set forth or shown in the accompanying drawings is to be interpreted as illustrative and not in a limiting sense.

The invention having been described, what is claimed is:

1. Valve apparatus, comprising a body having a bore therethrough and a guide way therein intersecting the bore, a closure member closely fittable within the guideway for movement between positions opening and closing the bore, an outlet from the guideway, a bonnet movable between positions opening and closing the outlet, and means including a crank arm engageable with the closure member and swingably mounted on the body for moving the closure member between opened and closed positions and another position loosely received within the guideway, said crank arm being swingable out of engagement with the closure member and into a position permitting removal of said closure member through the outlet when said closure member is disposed in said other position.

2. Valve apparatus of the character defined in claim 1, wherein the outlet is in the outer end of the guideway and the outer end of the closure member projects outwardly from the outlet in said other position thereof.

3. Valve apparatus, comprising a body having a bore therethrough and a guideway therein intersecting the bore, a closure member closely fittable within the guideway for movement between positions opening and closing the bore, a slot in the closure member opening to one side thereof, an outlet from the guideway, a bonnet movable between positions opening and closing the outlet, and means including a crank arm having one end receivable within the slot and swingably mounted on the body for moving the closure member between opened and closed positions and another position loosely received within the guideway, said one end of the crank arm being swingable through the one side of the slot and into a position permitting removal of the closure member through the outlet when said closure member is disposed in said other position.

4. Valve apparatus of the character defined in claim 3, wherein an imaginary straight line through the axis of the swingable mounting and the one end of the crank arm is substantially perpendicular to the opposite sides of the slot at the end of its closing and start of its opening movement and swings toward and away from a position substantially parallel to said opposite sides of the slot throughout the remainder of its opening and closing movements, respectively.

5. Valve apparatus of the character defined in claim 3, wherein the outer end of the guideway has a relieved portion to receive the closure member in said other position.

6. Valve apparatus, comprising a body having a bore therethrough and a guideway therein intersecting the bore, a closure member closely fittable within the guideway for movement between positions opening and closing the bore, the outer end of the guideway having a relieved portion to receive the closure member loosely within the guideway, an outlet from the guideway, a bonnet movable between positions opening and closing the outlet, a shaft rotatably mounted on the body, and a crank arm on the shaft engageable with the closure member and swingable to move said closure member between open and closed positions and another position received within the relieved portion, said crank arm being swingable out of engagement with the closure member to permit removal of said closure member through the outlet when said closure member is received within the relieved portion.

7. Valve apparatus of the character defined in claim 6, wherein said shaft is rotatable about an axis transverse to and offset from the guideway.

8. Valve apparatus of the character defined in claim 6, including a recess in the guideway to receive the crank arm after it swings out of engagement with the closure member.

9. Valve apparatus, comprising a body having a bore therethrough and a guideway therein intersecting the bore, a closure member closely fittable within the guideway for movement between positions opening and closing the bore, the outer end of the guideway having a relieved portion to receive the closure member loosely within the guideway, a slot in the closure member opening to one side thereof, an outlet from the guideway, a bonnet movable between positions opening and closing the outlet, a shaft rotatably mounted on the body, and a crank arm on the shaft having one end receivable within the slot to move the closure member between opened and closed positions and another position received within the relieved portion, said one end of the crank arm being swingable through the open end of the slot to permit removal of said closure member through the outlet when said closure member is received within the relieved portion.

10. Valve apparatus of the character defined in claim 9, wherein an imaginary straight line through the axis of the swingable mounting and the one end of the crank arm is substantially perpendicular to the opposite sides of the slot at the end of its closing and start of its opening movement and swings toward and away from a position substantially parallel to said opposite sides of the slot through the remainder of its opening and closing movements, respectively.

11. Valve apparatus, comprising a body having a bore therethrough and a guideway therein intersecting the bore, a closure member closely fittable within the guideway for movement between positions opening and closing the flowway, a slot in the closure member opening to one side thereof, means on the closure member for sealing with one side of the guideway during its movement between opened and closed position, the other side of the guideway being relieved at its outer end to receive the closure member loosely within said guideway and out of sealing engagement with said one side thereof, an outlet from the guideway, a bonnet movable between positions opening and closing the outlet, and means including a crank arm having one end receivable within the slot and swingably mounted on the body for moving the closure member between opened and closed positions and another position received within the relieved portion, said one end of the crank arm being swingable through the one side of the slot and into a position permitting removal of said closure member through the outlet when said closure member is received within said relieved portion.

12. Valve apparatus of the character defined in claim 11, wherein an imaginary straight line through the axis of the swingable mounting and the one end of the crank arm is substantially perpendicular to the opposite sides of the slot at the end of its closing and start of its opening movement and swings toward and away from a position substantially parallel to said opposite sides of the slot through the remainder of its opening and closing movements, respectively.

13. Valve apparatus, comprising a body having a bore therethrough and a guideway therein intersecting the bore, a closure member closely fittable within the guideway for movement between positions opening and closing the flowway, a slot in the closure member opening to one side thereof, seal means on the closure member including a sealing strip thereacross for sealing engagement with one side of the guideway during movement of the closure member between opened and closed positions, the outer end of the other side of the guideway being relieved to receive the closure member loosely and with its sealing strip out of sealing engagement with the inner end of said one side of the flowway, a shoulder on the closure member slidable within the relieved portion during its movement between opened and closed positions, a bonnet movable between positions opening and closing the outer end of the guideway, a shaft rotatably mounted on the body, and a crank arm on the shaft having one end receivable within the slot and swingable to move the closure member between opened and closed positions and another position in which the shoulder thereon is removed from the guideway to permit said member to be received within the relieved portion, said one end of the crank arm being swingable out of engagement with the open end of the slot to permit removal of said closure member through the open outer end of the guideway when said closure member is received within the relieved portion.

14. Valve apparatus of the character defined in claim 13, wherein the sides of the slot slope outwardly toward the one side of the guideway so that the one end of the crank arm urges the sealing strip on the closure member away from said one side at the start of the opening movement of the closure member.

15. Valve apparatus of the character defined in claim 13, wherein an imaginary straight line through the axis of the swingable mounting and the one end of the crank arm is substantially perpendicular to the opposite sides of the slot at the end of its closing and start of its opening movement and swings toward and away from a position substantially parallel to said opposite sides of the slot through the remainder of its opening and closing movements, respectively.

16. Valve apparatus, comprising a body having a bore therethrough and a guideway therein intersecting the bore, a closure member longitudinally movable within the guideway, a slot in the closure member, an outlet from the guideway, a bonnet movable between positions opening and closing the outlet, and means including a crank arm having one end receivable within the slot and swingably mounted on the body for moving the closure member into and out of a position closing the bore, said one end of the crank arm being movable out of the slot and into a position permitting removal of said closure member through the outlet, and wherein an imaginary straight line through the axis of the swingable mounting and the one end of the crank arm is substantially perpendicular to the slot at the start of its opening movement and swings toward a position substantially parallel to the slot throughout the remainder of its opening movement.

17. Valve apparatus, comprising a body having a bore therethrough and a guideway therein intersecting the bore, a closure member longitudinally movable within the guideway, a slot in the closure member, an outlet from the guideway, a bonnet closing the outlet, a shaft rotatably mounted on the body, and a crank arm on the shaft having one end receivable within the slot and swingable to move the closure member into and out of a position closing the bore, said bonnet being movable to a position opening the outlet and said one end of the crank arm being movable out of the slot and into a position permitting removal of the closure member through the outlet, and wherein an imaginary straight line through the axis of the swingable mounting and the one end of the crank arm is substantially perpendicular to opposite sides of the slot at the end of its closing and start of its opening movement and swings toward and away from a position substantially parallel to the opposite sides of the slot throughout the remainder of each of its opening and closing movements.

18. Valve apparatus of the character defined in claim 17, wherein the one end of the crank arm is provided with a roller engageable with opposite sides of the slot, and said opposite sides of the slot are flat and extend in directions which form acute angles with the direction of movement of the closure member.

19. Valve apparatus of the character defined in claim 18, wherein said closure member is provided with a sealing strip across the side thereof toward which the sides of the slot are outwardly sloped.

20. Valve apparatus of the character defined in claim 17, wherein the one end of the crank arm is provided with a roller engageable with opposite sides of the slot, and said opposite sides of the slot are curved and extend in directions which form acute angles with the direction of movement of the closure member.

21. Valve apparatus of the character defined in claim 20, wherein said closure member is provided with a sealing strip across the side thereof toward which the sides of the slot are outwardly sloped.

22. Valve apparatus, comprising a body having a bore therethrough and a guideway therein intersecting the bore, a closure member longitudinally movable within the guideway, a slot in the closure member, a bonnet movable between positions opening and closing the outer end of the guideway, and means including a crank arm having one end receivable within the slot and swingably mounted on the body for moving the closure member between positions opening and closing the bore and another position in which its outer end projects from the open outer end of the guideway, said one end of the crank arm being movable out of the slot and into a position permitting removal of said closure member through the open outer end of the guideway, and wherein an imaginary straight line through the axis of the swingable mounting and the one end of the crank arm is substantially perpendicular to one side of the slot at the start of its opening movement and swings toward a position substantially parallel to the slot throughout the remainder of its opening movement.

23. Valve apparatus, comprising a body having a bore therethrough and a guideway therein intersecting the bore, a closure member movable within the guideway between a closed position in which its inner end is extended across the bore and an open position in which its inner end is retracted from the bore, a slot in the closure member, an outlet from the guideway, a bonnet closing the outlet, a shaft rotatably mounted on the body, and a crank arm on the shaft having one end receivable within the slot swingable to move the closure member between opened and closed positions and another position in which its inner end is further retracted from the bore, said bonnet being movable to a position opening the outlet and said one end of the crank arm being movable out of the slot and into a position permitting removal of the closure member through the outlet, and wherein an imaginary straight line through the axis of the swingable mounting and the end of the crank arm is substantially perpendicular to opposite sides of the slot at the end of its closing and start of its opening movement and swings toward and away from a position substantially parallel to the opposite sides of the slot throughout the remainder of each of its opening and closing movements.

24. Valve apparatus, comprising a body having a bore therethrough and a guideway therein intersecting the bore, a closure member slidably movable within the guideway between opened and closed positions, a sealing strip slidably engageable between one side of the closure member and one side of the guideway, and means including an actuator mounted on the body for moving said closure member between opened and closed positions and urging said one side of the closure member in a direction away from said one side of the guideway to relieve the frictional force between the closure member and the guideway while maintaining a seal therebetween during the opening movement of the closure member.

25. Valve apparatus, comprising a body having a bore therethrough and a guideway therein intersecting the bore, a closure member movable within the guideway between opened and closed positions, a sealing strip on one side of the closure member for sliding engagement with one side of the guideway, a slot on the closure member, and means including a crank arm having one end receivable within the slot and swingably mounted on the body for moving the closure member between opened and closed positions, one side of said slot being sloped in a direction outwardly toward said one side of the closure member for engagement by said one end of the crank arm to urge said one side of the closure member away from said one side of the guideway at the start of its opening movement.

26. Valve apparatus of the character defined in claim 25, wherein there is an outlet from the guideway having a bonnet which is movable to a position opening the outlet and said one end of the crank arm is swingable out of said slot and into a position permitting removal of the closure member through the outlet.

27. Valve apparatus, comprising a body having a bore therethrough and a guideway therein intersecting the bore, a bonnet movable between positions opening and closing the outer end of the guideway, a closure member longitudinally movable within the guideway, a sealing strip on one side of the closure member for sliding engagement with one side of the guideway, a slot on the closure member, and means including a crank arm having one end receivable within the slot and swingably mounted on the body for moving the closure member between opened and closed positions and another position in which its outer end projects from the open outer end of the guideway, one side of said slot being sloped in a direction outwardly toward said one end of the closure member for engagement by said one end of the crank arm to urge said one side of the closure member away from said one side of the guideway at the start of its opening movement.

28. Valve apparatus, comprising a body having a bore therethrough and a guideway therein intersecting the bore, a closure member closely fittable within the guideway for movement between positions opening and closing the bore, an outlet from the guideway, a bonnet movable between positions opening and closing the outlet, and means for moving the closure member between opened and closed positions and another position outwardly from said opened position loosely received in the guideway from which other position the closure member may be removed from the guideway through said outlet.

29. Valve apparatus, comprising a body having a bore therethrough and a guideway therein intersecting the bore, a closure member longitudinally slidable within the guideway between opened and closed positions, a sealing strip slidably engageable between one side of the closure member and one side of the guideway during such movement, and means for moving said closure member between opened and closed positions and urging said one side of the closure member in a direction away from said one side of the guideway during the opening movement of the closure member to relieve the frictional force between the closure member and the guideway while maintaining a seal therebetween.

(References on following page)

References Cited in the file of this patent

UNITED STATES PATENTS

| | | |
|---|---|---|
| 998,400 | Ruth | July 18, 1911 |
| 1,388,331 | George | Aug. 23, 1921 |
| 1,862,173 | Bertram | June 7, 1932 |
| 1,916,278 | Mitchell | July 4, 1933 |
| 1,970,964 | Hosmer | Aug. 21, 1934 |
| 2,387,106 | Allen | Oct. 16, 1945 |
| 2,743,618 | Watson | May 1, 1956 |
| 2,749,078 | Losey | June 5, 1956 |
| 2,942,616 | Wilde | June 28, 1960 |
| 2,964,284 | Allen | Dec. 13, 1960 |
| 2,975,795 | Allen | Mar. 21, 1961 |